Oct. 9, 1934.    W. D. ARCHEA    1,976,104
MILLING MACHINERY
Filed Dec. 6, 1929    4 Sheets-Sheet 1

Inventor
WALTER D. ARCHEA

By    AHK Parsons

Attorney

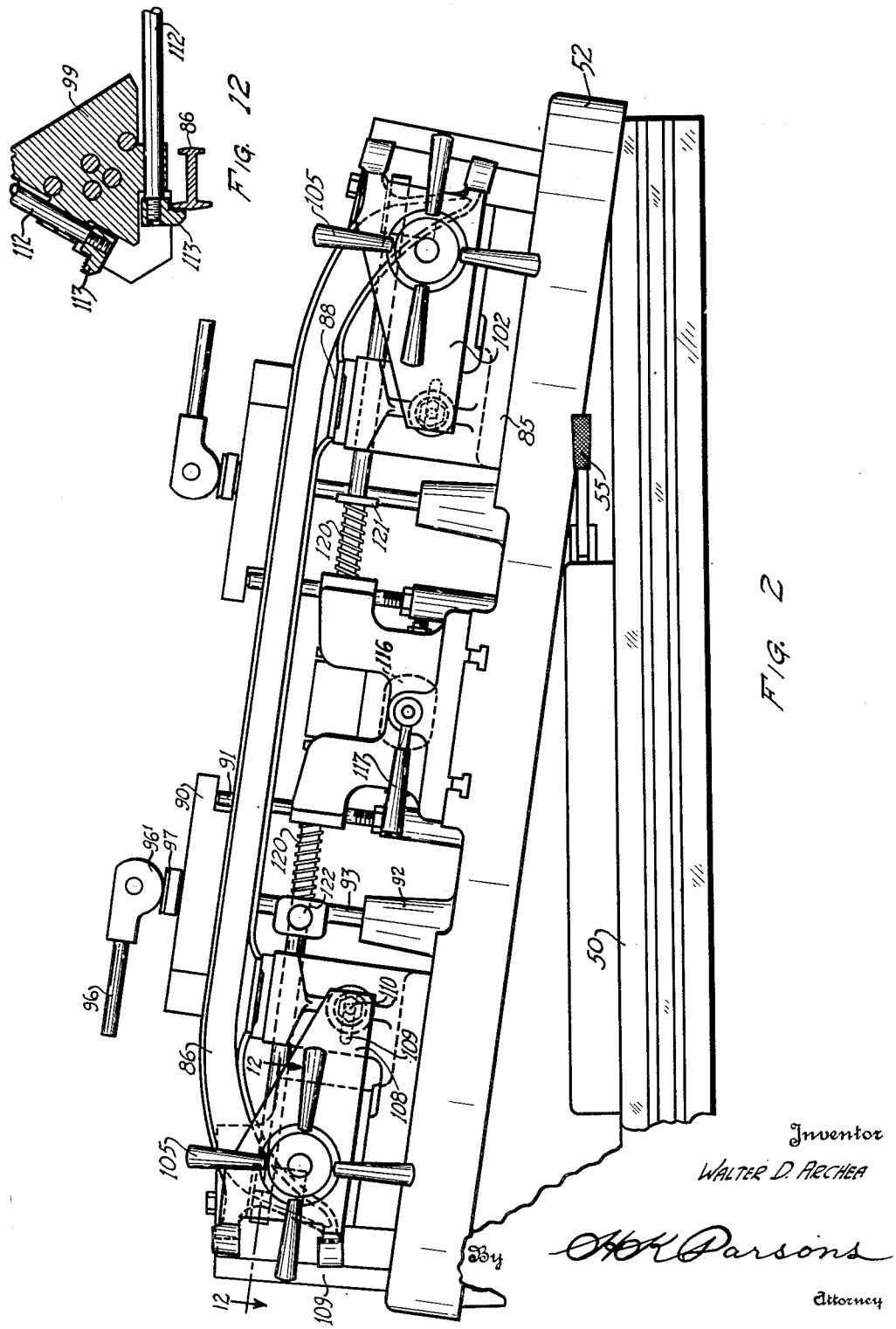

Oct. 9, 1934.  W. D. ARCHEA  1,976,104
MILLING MACHINERY
Filed Dec. 6, 1929   4 Sheets-Sheet 3
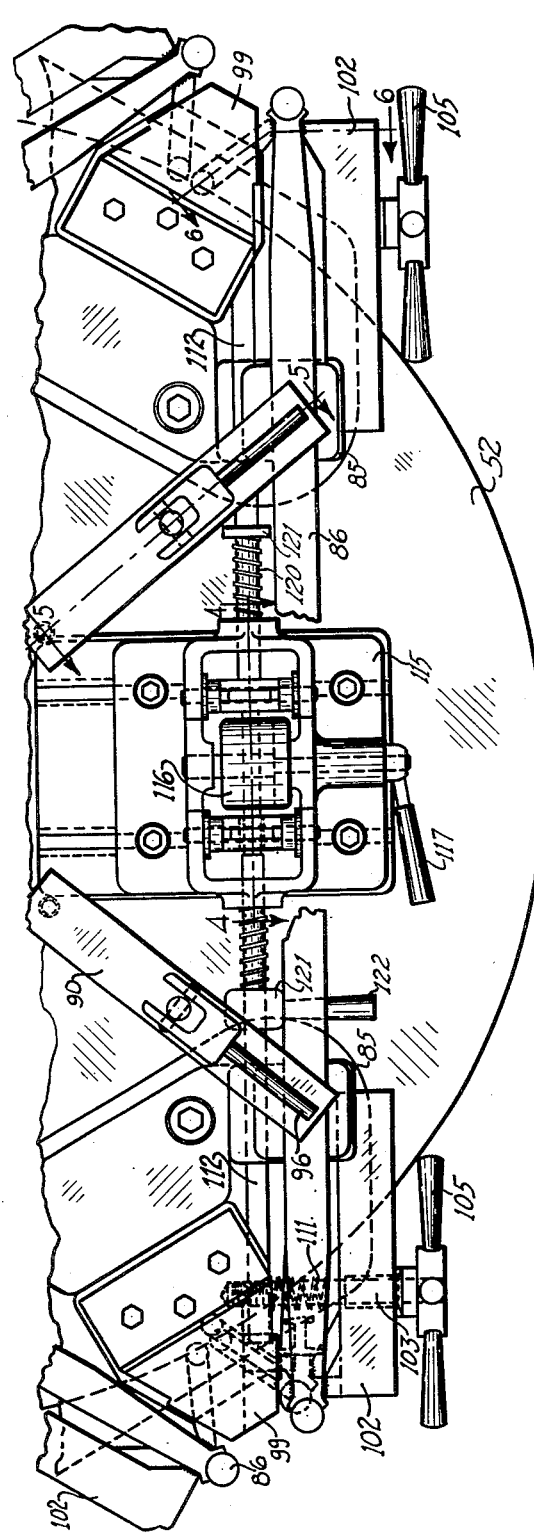
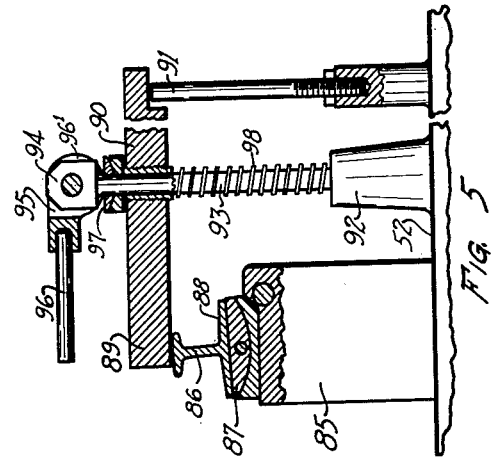
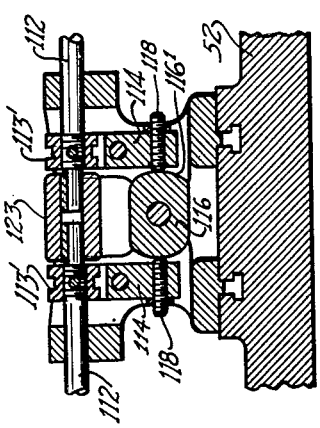
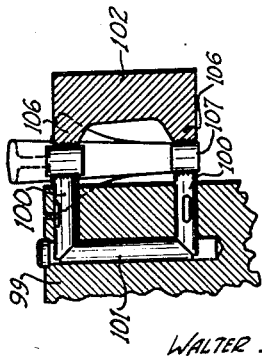
Inventor
WALTER D. ARCHEA
By A. H. Parsons
Attorney

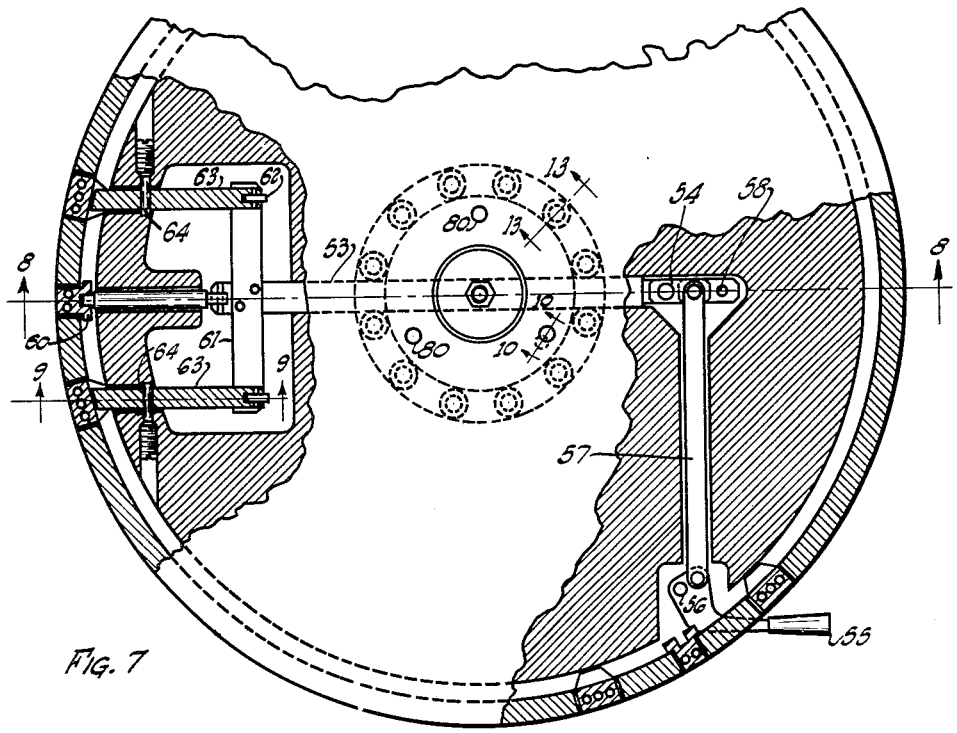
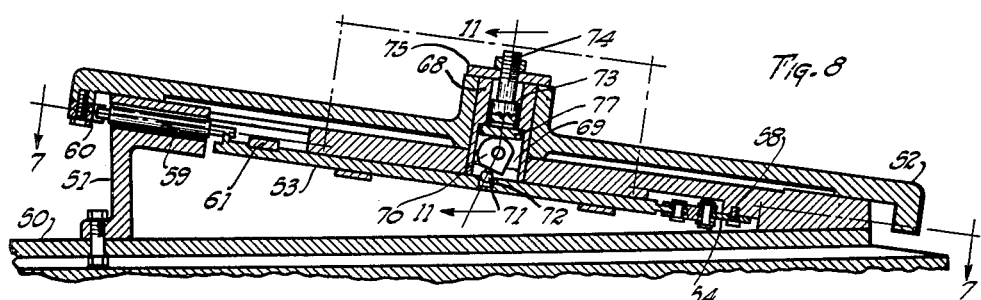
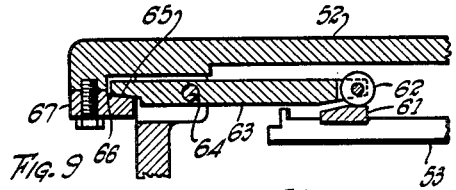
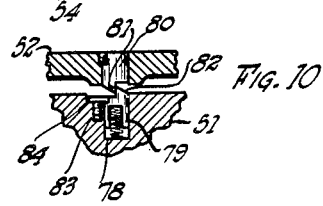
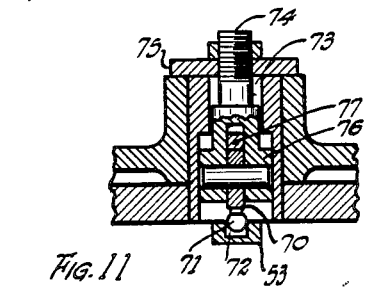

Patented Oct. 9, 1934

1,976,104

UNITED STATES PATENT OFFICE 1,976,104

MILLING MACHINERY

Walter D. Archea, Cincinnati, Ohio, assignor to The Cincinnati Milling Machine Company, Cincinnati, Ohio, a corporation of Ohio Application December 6, 1929, Serial No. 412,242

6 Claims. (Cl. 90—21)

This invention relates to milling machines and more particularly to machines of the intermittent milling type.

It is usual in such machines to provide a work holding member adapted to move the work carried thereby into and out of engagement with a cutting element, to perform intermittent milling operations thereupon, and it is one of the objects of this invention to provide an improved and simplified mechanism to accomplish this purpose.

Another object of this invention is to provide an improved work holding means for long slender work pieces.

A further object of this invention is the provision of a machine for milling work pieces which have two ends which must be milled in opposite angular relation to one another and a work holder in which an opposite end of two such work pieces may be placed in adjacent relation to one another, to be milled simultaneously.

Other objects and advantages of the present invention should be readily apparent by reference to the following specification, considered in conjunction with the accompanying drawings illustrative of one embodiment thereof, but it will be understood that I may make any modifications in the specific structural details hereinafter disclosed, within the scope of the appended claims, without departing from or exceeding the spirit of the invention.

In the drawings, in which like reference numerals indicate like parts:

Figure 2 is a side view of the work holder;

Figure 3 is a partial plan view of the work holder;

Figure 4 is a vertical section on the line 4—4 of Figure 3;

Figure 5 is a vertical section on the line 5—5 of Figure 3;

Figure 6 is a vertical section on the line 6—6 of Figure 3;

Figure 7 is a plan view of the work table partly in section, as on line 7—7 of Figure 8;

Figure 8 is a vertical section of the work table on the line 8—8 of Figure 7;

Figure 9 is a section on the line 9—9 of Figure 7;

Figure 10 is a section taken as on line 10—10 of Figure 7;

Figure 11 is a section on line 11—11 of Figure 8;

Figure 12 is a section on the line 12—12 of Figure 2; and

Figure 13 is a section on the line 13—13 of Figure 7.

Figure 1:
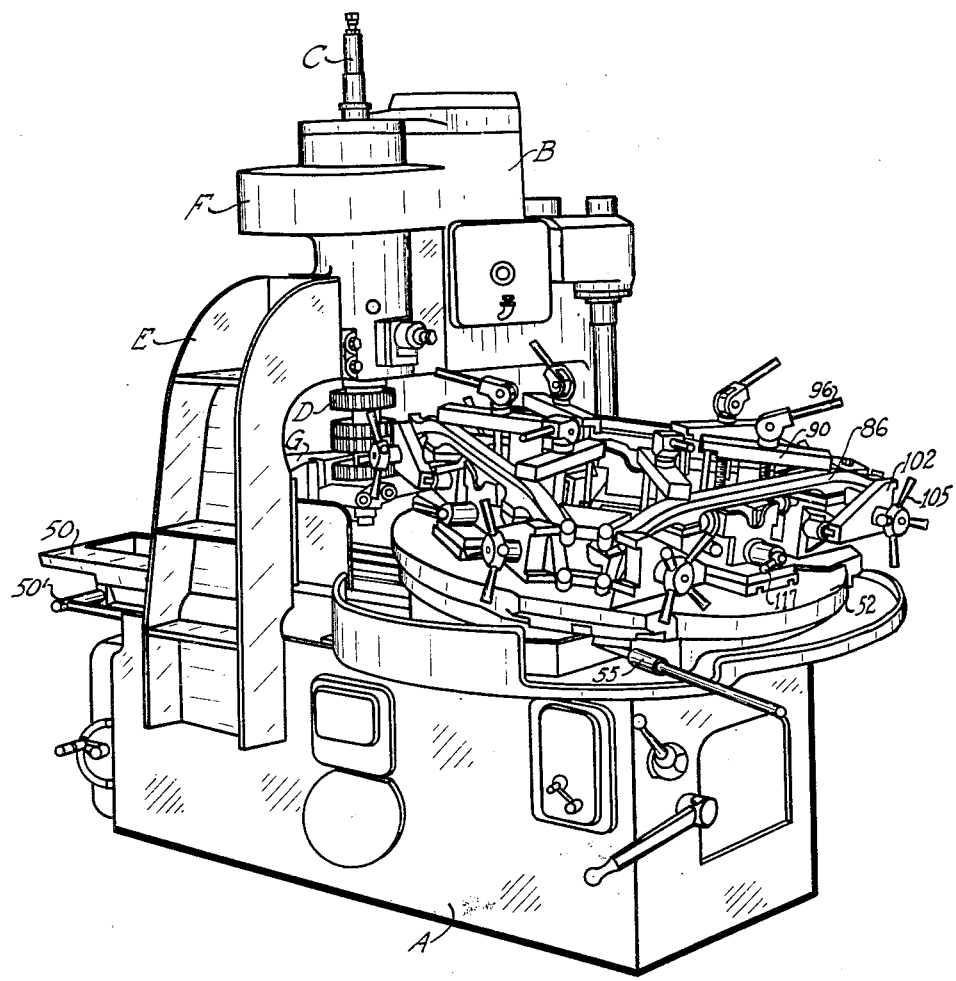
Figure 1 is a perspective view of the machine.

Referring to Figure 1 of the drawings, the bed A of the machine has uprising therefrom, on one side, a column B having an overhanging arm F in which is journaled in the outer end thereof, the cutter spindle C, on the lower end of which are mounted the cutters D. The bracket E, supported by the bed, serves as an outboard support for the overhanging arm F of the column B. Projecting from the bracket E is the arm G, which serves as a support for the lower end of the cutter spindle C.

Slidably mounted on the bed A is a reciprocating slide 50, adapted to be moved at either feed or rapid traverse rates by hydraulic means 50'. Fastened to the slide 50, as shown in Figure 8, is the inclined support 51, upon which is mounted the rotatable index table 52. This table is adapted to be simultaneously locked and clamped to its support 51 by the link 53, which may be reciprocated through means of the toggle joint 54 by the operating handle 55. The handle 55 is pivotally mounted on a pin 56 in the support and is connected through rod 57 to the toggle 54. One end of the toggle 54 is pivotally mounted on the fixed pin 58, with the result that when the handle 55 is pulled toward the operator, the link 53 will be moved to the right, as shown in Figure 7, to simultaneously unclamp and unlock the table.

One end of the link 53 is directly connected, as by a rib and groove, with the locking plunger 59 slidably mounted in the support and adapted to engage the locking member 60. The link 53 carries a cross arm 61 which engages rollers 62 mounted in the ends of clamping members 63. These clamping members are pivotally mounted in the support as by pins 64, and have their ends beveled as at 65, for engaging the beveled surface 66 of the flange 67 which is fixed on the under side of the periphery on the table. The operation is such that when the link 53 is moved to the left, as shown in Figure 7, the ends of the cross arm 61 engage the rollers 62, thereby pivoting members 63 and causing the surfaces 65 thereof to frictionally engage with the surface 66 on the table. This same movement of the link 53 moves the plunger 59 into locking engagement with the member 60. Thus the table is clamped and locked at the same time by a single operating lever.

The table 52 is supported in the center on spring pressed anti-friction balls or rollers mounted in the support 51, as shown in detail in Figure 13, and when the table is unclamped, these rollers tend to lift and support the table for free rotation. To force the table down into clamped position against the pressure of these springs, additional clamping means are provided, since the clamping members 63 only act on one side of the table and would tend to tilt the same. In furtherance of this, the support 51 is provided with an upstanding portion 68, about which the table rotates. This portion has a large bore 69 (Figure 11) housing a cam 70 having an integral lug 71 which fits in a groove 72 of the link 53. Mounted in a smaller bore 73 is a clamping member 74 which engages with its upper end a plate 75 for clamping the table 52 downward against the support 51. This clamping member 74 is provided with a bifurcated end 76, in which is pivoted the cam 70 for engagement with a block 77. The ends of the block 77 engage the shoulder formed by the bore 69, so that, when the cam 70 is rotated in a clockwise direction by the link 53, it draws the member 74 downward, to thereby clamp the table.

The table 52, being adapted in this case to carry three work pieces, is indexed 120 degrees after each operation. There is therefore provided indexing means for this particular spacing although, of course, other spacings could be provided without departing from the scope of the invention. Referring to Figure 10, there is provided in the support 51 a bore 78, in which is mounted the spring pressed plunger 79. There are also provided in the table 52, three pins 80 which are spaced 120 degrees apart and which have a vertical flat face 81 for engagement with the vertical flat face 82 of the plunger 79. Both the pins and the plunger have beveled faces, so that upon rotation of the table 52 in one direction, the pins 80 may force down the plunger 79 and thereby ride over it. The plunger 79 has a small shoulder for engaging a plate 84 fixed in the support 51. When the plunger 79 is forced upward by its spring, after being depressed by one of the pins 80, the shoulder 83 engages the plate 84 with a sharp clicking sound. This enables the operator to tell when the table has been indexed 120 degrees, and the table is then moved backward until the vertical surfaces 81 and 82 engage, at which time the table is clamped by the handle 55.

The table 52 is provided with three work holding fixtures and since each one is the same, only one will be described. The work piece 86 is supported near each end on blocks 85 which are carried by the table 52. In this case, the work pieces are front axles of automobiles and the blocks 85 are provided with rocking members 87 for engaging the pads 88 of the axle. Hold-downs 89 are provided for each block 85 and consist of a clamping member 90 supported at one end by the upstanding pin 91 and engaging the work 86 at the other end. The boss 92 on the table 52 is provided with a bolt 93 which has a head 94 engaged in the bifurcated end 95 of the clamping member 96. The end 95 is provided with a cam surface 96' for engagement with a bushing 97 carried in the member 90, whereby rotation of the handle 96 in an anti-clockwise direction, as shown in Figure 5, will force the member 90 downward and thereby clamp the work piece. The bolt 93 is provided with a spring 98, so that when the work is unclamped, the member 90 will be lifted without further attention of the operator.

The work pieces are also laterally supported at each end by means as shown in Figure 6. Fixtures 99, carried by the table, are provided with equalizing clamps 100, which have their ends beveled at 45 degrees for engagement with equalizing member 101. A clamping jaw 102 is supported on each fixture 99 by a bolt 103, which also serves as a clamping means by rotation of a handle 105. The jaw 102 has fingers 106 for clamping the forked ends 107 of the work piece against the clamps 100. The end 108 of the member 102 is provided with a groove 109 for engagement with a pin 110 fixed in the block 85. This pin and slot arrangement tends to prevent rotation of the member 102 about the bolt 103. The bolt 103 is threaded into the fixture 99 and is provided with a spring 111, whereby rotation of the handle 105, in one direction will tend to clamp the work, and rotation of the handle in the opposite direction will tend to unclamp the work by means of the spring.

There is also provided a further clamping means which tends to prevent longitudinal movement of the work piece. This consists of the two longitudinal slidable members 112, each having a head 113 for engaging the opposite ends of the work piece. The opposite ends of each member 112 are provided with a spool 113' pinned thereto and adapted to be engaged by the forked ends of the pivoted members 114. Rotatably mounted in the bracket 115 is the cam 116 adapted to be rotated by the handle 117. The cam 116 has lobes 116' for engagement with set screws 118 threaded into members 114. It is thus seen that rotation of the cam 116 will tend to pivotally move the members 114, thereby drawing the rods 112 toward one another and clamping the work against longitudinal movement.

The set screws 118 provide a means for adjusting the position of the members 113 so that each will be the same distance from the center of the work holding means. This is important because the members 113 are operated by a single member, the cam 116, and it is desired that the work pieces project or overhang the work table the same amount at each end, for engagement with the cutter.

Since the work pieces may vary somewhat in length, it is desired that this variation in length be proportioned and, therefore, the members 113 act to center the work piece longitudinally and thus have equal amounts projecting over the side of the table.

It should be apparent from the description that means have been provided for clamping each work piece against movement in any one of three directions. It will also be noted, from Figure 3, that the work holding means are so arranged that the ends of two different work pieces are arranged adjacent to one another, thereby making it possible to mill a corresponding surface on each work piece with a single cutter. Another important feature of the work holding means is the positioning of the work piece on the inclined table. It will be noted that the highest side of the work table is adjacent the cutter axis and that two of the work pieces form a V with its apex adjacent the cutter axis, and that each work piece slopes downward and to one side of the center of the table. This brings about the important effect that when the horizontal cutter finishes a surface in the work piece, the surface so formed is at an angle to the longitudinal axis of the work piece and is also at an angle to an axis passed through the center of the work piece at right angles to the longitudinal axis.

Since the two ends of a work piece have to be finished in opposite angular relation to one another, positioning the work in the form of a V allows one piece to be positioned at the opposite angle to the second piece and thus the two adjacent ends may be milled simultaneously.

To insert a work piece in the holder, the members 89 are moved to one side out of the way and the members 113 are moved to a vertical position by rotating the rods 112 by means of the handle 122 fixed to one of them. The two rods are connected together by the sleeve 123 having a splined connection with each rod, so that when one is rotated, the other is rotated also. The jaws 102 are held in open position by their springs and this allows placing the work piece on the supports 87, with the end bosses of the work piece between the fingers 106 and the equalizing clamps 100. After inserting the work, the members 113 are now moved to a horizontal position by the handle 122 and then moved longitudinally by the handle 117 acting through the cam 116 and pivoted member 114. This draws the two members toward one another and centers the work piece longitudinally as well as clamping it. The handles 105 are now rotated, to effect clamping of the end bosses of the work by the jaws 102, and the hold-downs 89 are moved into place and clamped by the handles 96. The removal of the work piece is effected by performing these operations in the reverse order.

The operation of the machine, as a whole, will now be described. Assuming that the table 52 has been loaded with work pieces, the operator feeds the table 50 to carry the work into the cutters. This may be accomplished by rapidly traversing the table until the work is about to be engaged by the cutters, at which time he may then shift to a feeding rate. This, of course, might be accomplished by dogs mounted on the side of the table, in the ordinary practice, or may be controlled by hand. After the milling operation on the ends of two pieces has been performed, the table 50 is returned to loading position and indexed 120 degrees. This cycle of operation is repeated until a work piece which has been finished on both ends is at the loading position. Thereupon, while the cutter or cutters are performing a milling operation on the ends of two work pieces, the third piece, which has been finished, may be replaced by an unfinished work piece.

That which is claimed is:

1. In a device of the class described a table, a support therefor having locking and clamping means for co-operation with said table including a pair of pivoted clamping members and a slidable locking member, a reciprocable link directly connected to the locking member for actuation thereof and carrying a cross member for simultaneously actuating said clamping members.

2. An index table, a base therefor having a locking bolt, a plurality of members carried by said table and equally spaced thereon for co-operation with said bolt to lock the table in a plurality of index positions, coacting means mounted on said table and base for audibly indicating upon rotation of the table when one of said members is in position to co-operate with said bolt.

3. A milling machine having a support, a slide reciprocably mounted thereon, a cutter journaled at right angles to the plane of the slide, means to position a work piece on the slide at an angle to the axis of the cutter comprising an inclined index table mounted on the slide, means carried by the table to position a work piece thereon to effect a second angular relation with respect to the cutter axis whereby upon reciprocation of the slide a surface will be produced having a compound angle, and means to lock the table in a second indexed position to present the opposite end of the work to the cutter to produce a similar surface but of opposite hand.

4. A milling machine having a reciprocable slide, a cutter journaled in normal relation to the slide, an inclined index table mounted on the slide, means to position a plurality of work pieces around said table in equally spaced relation, so that reciprocation of the slide will present simultaneously the ends of two different work pieces to the cutter, the work piece being so positioned that the surfaces produced will be of opposite hand, and means to lock the table in a second indexed position to present the opposite end of one of said two work pieces and the end of a third work piece to the cutter to thereby complete one work piece with its ends finished to opposite hands.

5. A milling machine having a reciprocable slide, a cutter spindle journaled in normal relation to the slide, an inclined circular indexible table mounted on the slide, means to position a plurality of work pieces in equally spaced chordal relation on the table intersecting the periphery thereof, said table having as many indexed positions as there are work pieces on the table, means to lock the table in a given indexed position to present the ends of two different work pieces to the cutter upon reciprocation of the table, and means to lock the table in successive indexed positions to present additional pairs of work piece ends to the cutter.

6. A machine for milling the bosses on the forked ends of front axle frames for self-propelling vehicles comprising a plurality of co-axially arranged cutters, an inclined circular table, said table having its diameter representing the angle of inclination thereof intersecting the cutter axis at an angle, said frames having supporting pads thereon, supporting blocks carried by the table and spaced thereabout to receive said pads and position the frames in chordal relation to the circular table whereby the ends of the frames will be grouped in pairs about the periphery of the table, means to clamp the frames to the table against movement in three directions, means to support and guide the table for movement at right angles to the axis of the cutter whereby upon each reciprocation of the table the bosses on the forked ends of one frame will be machined at a compound angle relative to the longitudinal and vertical axes thereof and the bosses on the other frame will be milled at the same angle but of opposite hand thereto, means to support the table for indexing movement whereby a successive pair of ends may be aligned with the cutters and means to lock the table in indexed position during feeding of the work relative to the cutters.

WALTER D. ARCHEA.